Patented May 20, 1941

2,242,572

UNITED STATES PATENT OFFICE 2,242,572

CHROMABLE DYESTUFFS OF THE TRIARYL-METHANE SERIES AND A PROCESS OF PREPARING THEM

Wilhelm Eckert and Karl Schilling, Frankfort-on-the-Main, Germany, assignors to General Aniline & Film Corporation, New York, N. Y., a corporation of Delaware No Drawing. Application June 13, 1940, Serial No. 340,324. In Germany June 21, 1939

9 Claims. (Cl. 260—335)

The present invention relates to chromable dyestuffs of the triarylmethane series and to a process of preparing them.

We have found that new dyestuffs of valuable fastness properties are obtainable by condensing one molecular proportion of 5-sulfobenzene-1.2.4-tricarboxylic acid or of the isomeric 3-sulfobenzene-1.2.4-tricarboxylic acid (5- or -3-sulfotrimellitic acid) of the formulae:

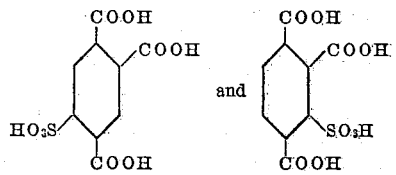

or the equivalent amount of the anhydrides or the alkali metal salts of these acids, with two molecular proportions of an aromatic hydroxy compound having a reactive nuclear hydrogen atom and containing, in meta-position to the hydroxy group, a substituted amino group or another hydroxy group.

Suitable aromatic-hydroxy compounds having a reactive nuclear hydrogen atom and, in meta-position to the hydroxy group, a substituted amino group or another hydroxy group are, for instance:

Mono- and di-N-substituted meta-aminophenols, such as 3-methylamino-1-hydroxybenzene, 3-methylamino-1-hydroxy-4-methylbenzene and the corresponding ethyl-, propyl-, butyl-, isobutyl- and higher alkyl-amino compounds; 3-dimethylamino-1-hydroxybenzene, 3-dimethyl-amino-1-hydroxy-4-methylbenzene and the corresponding diethyl-, dipropyl-, dibutyl-, diisobutyl- and higher dialkyl-amino compounds; N-substituted meta-aminophenols containing different substituents at the nitrogen atom, such as 3-methyl-ethylamino-1-hydroxybenzene, 3-methyl-ethylamino-1-hydroxy-4-methylbenzene, etc.; N-substituted meta-aminophenol compounds in which the substituent at the nitrogen atom is an aromatic or heterocyclic radical, such as 3-phenylamino-1-hydroxybenzene, 3-(2'.3'-dimethylphenyl)-amino-1-hydroxybenzene and other substitution products thereof; 3-piperidyl-1-hydroxybenzene (obtainable from resorcinol and piperidine at 150° C.), N-(3-hydroxyphenyl)-morpholine (obtainable from resorcinol and morpholine); N-substituted meta-aminophenol compounds containing sulfalkylamino- and hydroxyalkylamino groups, such as 3-disulfethylamino-1-hydroxybenzene, 3-ethyl-sulfethyl-amino-1-hydroxy-4-methylbenzene, 3-methyl-sulfethylamino-1-hydroxybenzene, 3-dihydroxyethylamino-1-hydroxybenzene; aromatic-hydroxy compounds containing another hydroxy group in meta position, such as 1.3-dihydroxybenzene and substituted 1.3-dihydroxybenzenes, for instance halogen-1.3-dihydroxybenzenes and nitro-1.3-dihydroxybenzenes, 4-carboxy-1.3-dihydroxybenzene, 1.2.3-trihydroxybenzene, methyl-1.3-dihydroxybenzene, 3-methoxy-1-hydroxybenzene, 1.3-dihydroxynaphthalene, etc.

The condensation of the components is preferably carried out in the presence of a flux, such as the reaction product of pyridine, zinc chloride and hydrochloric acid, by melting the reagents at a temperature of between about 150° C. and about 250° C.

The dyestuffs according to this invention which are obtained from 5-sulfobenzene-1.2.4-tricarboxylic acid, have the following general formula

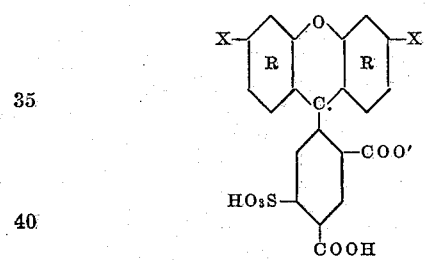

wherein the X's stand for a substituted amino group or for a hydroxy group and wherein the nuclei R may contain further substituents, or they correspond to the isomeric compound

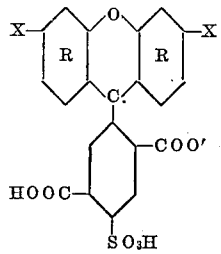

wherein the X's and R's have the above meaning, as it is not certain which of the two vicinal carboxyl groups forms the central carbon atom in the triarylmethane dyestuffs. Or the dyestuffs are mixtures of these two isomeric compounds.

The dyestuffs which derive from 3-sulfobenzene-1.2.4-tricarboxylic acid, correspond to the formulae:

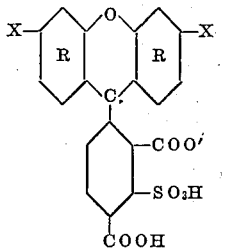

or

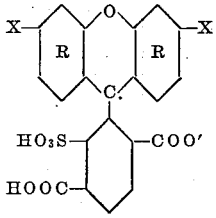

wherein the X's and R's have the above meaning, or they are mixtures of these isomeric compounds.

Our new dyestuffs dye the animal fiber from an acid bath very clear orange to bluish red tints. It is surprising that these compounds have the character of chromable dyestuffs, i. e. that their fastness properties are essentially enhanced by treating the dyeings with chromium salts.

The following examples serve to illustrate the invention, but they are not intended to limit it thereto, the parts being by weight:

(1) The finely ground mixture from 180 parts of the potassium salt of the 5-sulfobenzene-1.2.4-tricarboxylic acid (5-sulfo-trimellitic acid) obtainable by oxidation of the sodium salt of the 1.2.4-trimethylbenzene-5-sulfonic acid with potassium permanganate and acidification of the filtered oxidation liquor with mineral acids until the solution shows a feebly acid reaction to Congo paper, and 150 parts of 3-diethylamino-1-hydroxybenzene is introduced, while stirring, at 180° C. into 300 parts of a flux prepared from 1 mol each of pyridine, zinc chloride and hydrochloric acid. The temperature of the melt is then raised to 200° C.-210° C. and maintained for about 4 hours, while continuously stirring.

In order to isolate the dyestuff, the rather thinly liquid red melt showing a metallic surface lustre is poured on plates, the solidified, still warm cake is filled into a ball mill and ground therein until it is as fine as dust. The dyestuff powder thus obtained is introduced, while stirring, into 1000 parts of hydrochloric acid of 20 per cent. strength the powder dissolving thereby entirely. If this solution is slowly stirred into 5000 parts of a sodium chloride solution of 20 per cent. strength, the dyestuff separates in the form of a red powder which is filtered with suction, washed with dilute sodium chloride solution until it is neutral to Congo paper, and dried.

The dyestuff thus obtained probably has the following constitution:

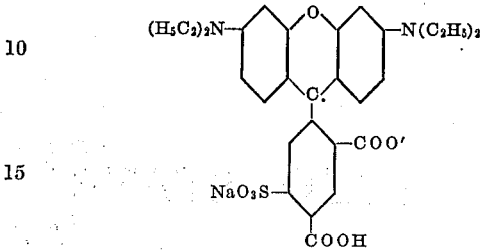

or the constitution of the isomeric compound:

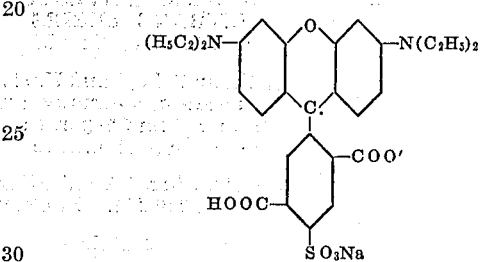

or the dyestuff constitutes a mixture of these isomeric compounds. It dyes animal fiber brilliant bluish-red tints; the fastness properties of these dyeings are considerably improved by after-chroming.

(2) By using 125 parts of 3-dimethylamino-1-hydroxybenzene instead of 150 parts of 3-diethylamino-1-hydroxybenzene named in Example 1 and by carrying out the process as described in said example, a dyestuff of similar properties is obtained.

(3) An intimate mixture of 368 parts of the potassium salt of 5-sulfobenzene-1.2.4-tricarboxylic acid and 500 parts of the disodium salt of 3-disulfethylamino-1-hydroxybenzene of 72 per cent strength (the rest being sodium chloride) is introduced, while stirring, at 180° C. into 800 parts of the flux named in Example 1. The temperature of the melt is raised to 200° C.-220° C. and maintained for 4-5 hours, while continuously stirring the melt. The melt is allowed to cool and then ground, while excluding moisture, to a fine powder which is stirred into 5000 parts of alcohol. The suspension produced of the dyestuff is boiled in a reflux condenser for 1 hour, while stirring, and filtered with suction while still hot. After the residue on the suction filter has been washed for several times with alcohol and dried, a dyestuff remains in the form of a red powder which dyes animal fiber clear bluish-red tints; the fastness properties of these dyeings are considerably improved by after-chroming. The dyestuff probably has the following constitution:

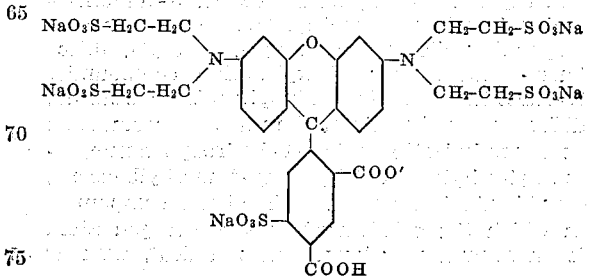

or the constitution of the isomeric compound

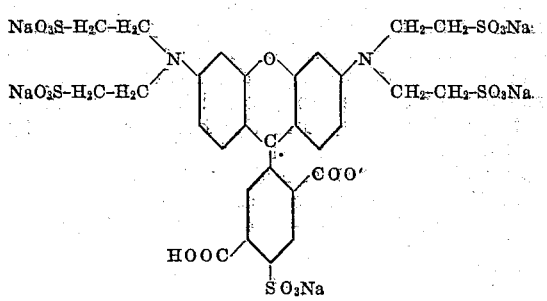

or the dyestuff is a mixture of these isomeric compounds.

(4) 368 parts of the potassium salt of 5-sulfo-benzene-1.2.4-tricarboxylic acid and 220 parts of 1.3-dihydroxybenzene are introduced, while stirring, at 180° C. into 600 parts of the flux named in Example 1. The temperature is raised to 200° C. and the mixture is kept for 6 hours at that temperature. The dyestuff produced is isolated by extracting the cold and finely ground melt with 2000 parts of hot water; the residue is washed with water until the zinc chloride is removed and then dried.

The dyestuff dies animal fiber brilliant yellow tints; the fastness properties of these dyeings are considerably improved by after-chroming.

The dyestuff probably has the following constitution:

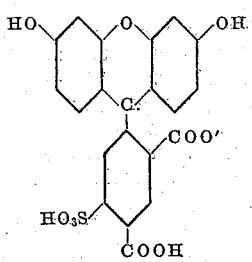

or the constitution of the isomeric compound:

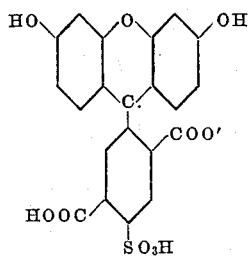

or the dyestuff is a mixture of these isomeric compounds.

(5) 24 parts of the dyestuff obtained according to the process described in Example 4 are dissolved with 10 parts of sodium carbonate and 250 parts of water, while gently heating it, so that a neutral yellow-red solution of the dyestuff is obtained. The solution is cooled to room temperature and, while rapidly stirring, 32 parts of bromine are introduced, drop by drop, in the proportion as it is consumed. A red precipitate gradually separates which, after the addition of the bromine is complete, is dissolved with 100 parts of 2n-caustic soda solution; the solution does not show an alkaline reaction. The solution is mixed with 50 parts of sodium chloride, the mixture is heated to about 80° C. and the dyestuff is precipitated with hydrochloric acid of 20 per cent strength. After cooling there is filtered with suction, washed with a solution of sodium chloride and dried.

The dyestuff has the formula:

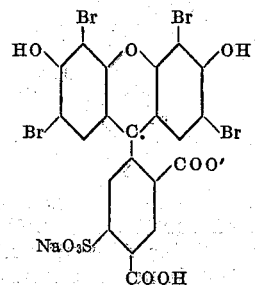

or that of the isomeric compound

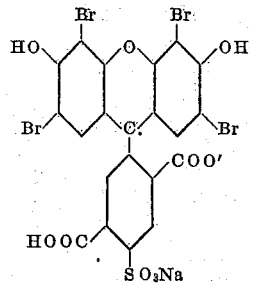

or the dyestuff is a mixture of these isomeric compounds. It dyes wool and silk very clear yellowish-red tints. After chroming the fastness properties of the dyeings are particularly remarkable.

We claim:

1. The compounds of the general formula

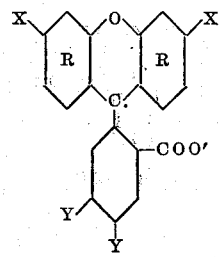

wherein the X's represent radicals of the group consisting of hydroxy groups and substituted amino groups, one Y stands for the sulfonic acid group and the other Y for the carboxylic acid group and wherein the nuclei R may contain further substituents.

2. The compound of the formula

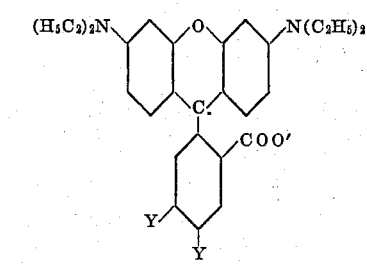

wherein one Y stands for the sulfonic acid group and the other Y for the carboxylic acid group, being a water-soluble dyestuff which dyes the animal fiber vivid bluish-red tints, the fastness properties of the dyeings being essentially enhanced by after-chroming.

3. The compound of the general formula

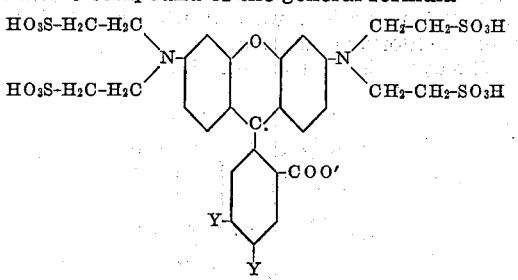

wherein one Y stands for the sulfonic acid group and the other Y for the carboxylic acid group, being a water soluble dyestuff which dyes the animal fiber clear bluish-red tints, the fastness properties of the dyeings being essentially enhanced by after-chroming.

4. The compound of the formula

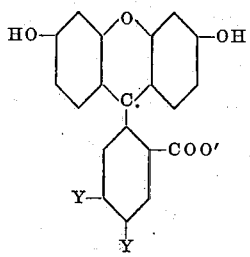

wherein one Y stands for the sulfonic acid group and the other Y for the carboxylic acid group, being a water soluble dyestuff which dyes the animal fiber vivid yellow tints, the fastness properties of the dyeings being essentially enhanced by after-chroming.

5. The process which comprises causing one mol of a sulfobenzene-1.2.4-tricarboxylic acid of the formula:

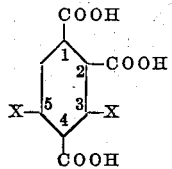

wherein one X represents the sulfonic acid group and the other X hydrogen, to react with two mols of an aromatic hydroxy compound having a reactive nuclear hydrogen atom and containing, in meta-position to the hydroxy group, a substituent of the group consisting of a substituted amino group and the hydroxy group by melting the reagents at a temperature of between about 150° C. and about 250° C.

6. The process which comprises causing one mol of a sulfobenzene-1.2.4-tricarboxylic acid of the formula:

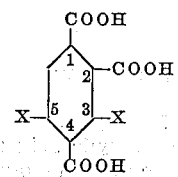

wherein one X represents the sulfonic acid group and the other X hydrogen, to react with two mols of an N-substituted meta-amino-phenol compound, containing a reactive hydrogen atom in para-position to the substituted amino group, by melting the reagents at a temperature of between about 150° C. and about 250° C.

7. The process which comprises causing one mol of the potassium salt of 5-sulfo-1.2.4-tricarboxylic acid to react with two mols of 3-diethylamino-1-oxybenzene by melting the reagents at about 200° C. to 210° C.

8. The process which comprises causing one mol of the potassium salt of 5-sulfo-1.2.4-tricarboxylic acid to react with two mols of 3-disulfethylamino-1-hydroxybenzene by melting the reagents at about 200° C.–220° C.

9. The process which comprises causing one mol of the potassium salt of 5-sulfo-1.2.4-tricarboxylic acid to react with two mols of 1.3-dihydroxybenzene by melting the reagents at about 200° C.

WILHELM ECKERT.
KARL SCHILLING.